(12) United States Patent
Xu et al.

(10) Patent No.: US 11,794,383 B2
(45) Date of Patent: Oct. 24, 2023

(54) MATERIAL WITH DIRECTIONAL THERMAL CONDUCTION AND THERMAL INSULATION AND PREPARATION METHOD THEREOF

(71) Applicant: Beijing Institute of Technology, Beijing (CN)

(72) Inventors: Baosheng Xu, Beijing (CN); Chenqi Wang, Beijing (CN); Lijie Qu, Beijing (CN); Yanfei Chen, Beijing (CN); Daining Fang, Beijing (CN); Yazheng Yang, Beijing (CN)

(73) Assignee: Beijing Institute of Technology, Beijing (CN)

( * ) Notice: Subject to any disclaimer, the term of this patent is extended or adjusted under 35 U.S.C. 154(b) by 0 days.

(21) Appl. No.: 17/816,465

(22) Filed: Aug. 1, 2022

(65) Prior Publication Data

US 2023/0249382 A1 Aug. 10, 2023

(30) Foreign Application Priority Data

Aug. 17, 2021 (CN) .......................... 202110944149.5

(51) Int. Cl.
*B29C 39/12* (2006.01)
*C09K 5/14* (2006.01)
(Continued)

(52) U.S. Cl.
CPC ............ *B29C 39/123* (2013.01); *B29C 39/42* (2013.01); *C08K 3/04* (2013.01); *C08L 61/06* (2013.01);
(Continued)

(58) Field of Classification Search
CPC ......... B29C 39/123; B29C 39/42; C08K 3/04; C08K 5/14; C08K 2201/001; C08L 61/06;
(Continued)

(56) References Cited

U.S. PATENT DOCUMENTS

2018/0249593 A1\* 8/2018 Zhang .................... B29C 48/04

FOREIGN PATENT DOCUMENTS

| CN | 105800146 A | \* | 7/2016 | ........... C04B 35/622 |
| CN | 105801146 A | | 7/2016 | |
| CN | 110198624 A | | 9/2019 | |

OTHER PUBLICATIONS

English Translation of CN 105800146A (Year: 2016).\*
(Continued)

*Primary Examiner* — Matthew J Daniels
*Assistant Examiner* — Olukorede Esan
(74) *Attorney, Agent, or Firm* — Thomas | Horstemeyer, LLP

(57) ABSTRACT

Disclosed is a material with directional thermal conduction and thermal insulation and a preparation method thereof. The method includes: (1) dispersing a viscose-based carbon fiber in water and adding a phenolic resin and polyacrylamide sequentially to obtain a dispersion I; dispersing a high-thermal conduction carbon fiber in water and adding a phenolic resin and polyacrylamide sequentially to obtain a dispersion II; (2) dividing equally the dispersion I and the dispersion II into several parts, respectively, pouring each part of the dispersion I and each part of the dispersion II into a mold alternately until all the dispersion I and the dispersion II are poured, draining after each pouring of a part of the dispersion I or a part of the dispersion II to obtain a porous
(Continued)

carbon fiber skeleton, and solidifying the skeleton to obtain a preform; (3) subjecting the preform to a heat treatment to obtain the material.

15 Claims, 1 Drawing Sheet

(51) Int. Cl.
    *C08L 61/06* (2006.01)
    *C08K 3/04* (2006.01)
    *B29C 39/42* (2006.01)
    *F16L 59/02* (2006.01)
    *B29K 61/04* (2006.01)
    *B29K 507/04* (2006.01)

(52) U.S. Cl.
    CPC .............. *C09K 5/14* (2013.01); *F16L 59/029* (2013.01); *B29K 2061/04* (2013.01); *B29K 2507/04* (2013.01); *B29K 2995/0013* (2013.01); *C08K 2201/001* (2013.01)

(58) Field of Classification Search
    CPC ............ B29K 2064/04; B29K 2507/04; B29K 2995/0013
    See application file for complete search history.

(56) References Cited

OTHER PUBLICATIONS

First Office Action, issued by The State Intellectual Property Office of China, CN Application No. 202110944149.5, dated Nov. 17, 2021 (4 pages).

\* cited by examiner

MATERIAL WITH DIRECTIONAL THERMAL CONDUCTION AND THERMAL INSULATION AND PREPARATION METHOD THEREOF

CROSS REFERENCE TO RELATED APPLICATION

This patent application claims the benefit and priority of Chinese Patent Application No. 202110944149.5, entitled "Material with directional thermal conduction and thermal insulation and preparation method thereof" filed on Aug. 17, 2021, the disclosure of which is incorporated by reference herein in its entirety as part of the present application.

TECHNICAL FIELD

The present disclosure belongs to the field of thermal protection, and in particular refers to a material with directional thermal conduction and thermal insulation and a preparation method thereof.

BACKGROUND ART

Thermal protection system (TPS) is considered to be a critical structure for preventing aerodynamic heating of the high-speed aircraft during launch and reentry. Thermal insulation materials, as an important constituent part of TPS, may prevent heat transfer from the outside to the inside. At present, ceramic thermal insulation tiles and composite aerogels thereof are mainly used as large-area thermal protection materials. In order to solve the problem of brittleness of the ceramic thermal insulation tiles, carbon-bonded carbon fiber (CBCF) composites are widely used in TPS as a novel thermal insulation material. The CBCF is composed of a skeleton of chopped carbon fibers, and has a density as low as 0.1 $g/cm^3$ to 0.5 $g/cm^3$ and porosity as high as 70% to 90% as well as excellent high-temperature resistance and thermal insulation properties. In fact, the surface temperature distribution of a high-speed aircraft varies during service. If a locally-generated high temperature is quickly delivered to other low-temperature areas to achieve heat homogenization, the thermal insulation efficiency of thermal protection materials will be greatly improved. Therefore, there is a need for a novel thermal protection material with low thermal conduction in a thickness direction and high thermal conduction in an in-plane direction.

Accordingly, in view of the above deficiencies, it is necessary to provide a concept of a thermal protection material integrating both thermal conduction and thermal insulation. That is, the material should have a relatively high thermal conductivity in an in-plane direction and an excellent thermal insulation performance in a thickness direction, and is manufactured based on an integrated design of layered thermal conduction layers and thermal insulation layers, thereby achieving a novel thermal protection material with directional thermal conduction and thermal insulation.

SUMMARY

A technical problem to be solved by the present disclosure is the uneven temperature distribution on the surface of thermal protection materials, resulting in low thermal insulation efficiency. In view of the deficiencies in the prior art, the present disclosure provides a material with directional thermal conduction and thermal insulation and a preparation method thereof to ensure that the material has a low thermal conductivity in the thickness direction and a high in-plane thermal conductivity, thereby improving the thermal insulation efficiency of the material itself.

In order to solve the above technical problems, the present disclosure provides a material with directional thermal conduction and thermal insulation and a preparation method thereof, and the preparation method includes:

(1) dispersing a viscose-based carbon fiber in water and adding a phenolic resin and polyacrylamide in sequence to obtain a dispersion I; dispersing a high-thermal conduction carbon fiber in water and adding a phenolic resin and polyacrylamide in sequence to obtain a dispersion II;

(2) dividing equally the dispersion I and the dispersion II into several parts, respectively, pouring each part of the dispersion I and each part of the dispersion II into a mold alternately until all the dispersion I and the dispersion II are poured, draining after each pouring of a part of the dispersion I or a part of the dispersion II to obtain a porous carbon fiber skeleton, and then solidifying the porous carbon fiber skeleton to obtain a preform; and (3) subjecting the preform obtained in step (2) to a heat treatment to obtain the material with directional thermal conduction and thermal insulation.

In the present disclosure, carbon fibers and a binder are dispersed in water to prepare a porous fiber skeleton, which is further subjected to a thermal treatment to obtain a material with directional thermal conduction and thermal insulation. During preparation, the phenolic resin is melted or pyrolyzed and carbonized at a high temperature and attached to surface of the fibers as a binder for the fibers to lap the fibers together. As a result, sites are formed at the lapped joints of the fibers, affording the fiber skeleton extremely high mechanical properties. The preparation process is simple and easy for operation. The product is adjustable in size and shape, easy for processing and allowed to be determined according to specific design requirements, and has a desirable thermal insulation performance.

In the present disclosure, the viscose-based carbon fiber and the high-thermal conduction carbon fiber may act as a thermal insulation structural unit and a thermal conduction structural unit, respectively. The phenolic resin used in the present disclosure may be the phenolic resins of any type or brand commonly used in the field without special limitation, and is used generally in powder form.

In some embodiments, in step (1), a mass ratio of the viscose-based carbon fiber, the phenolic resin and water is in a range of 1:(0.5-1):(50-70), for example 1:0.5:50, 1:0.7:55, 1:1:60, 1:1:65 or 1:1:70. In the present disclosure, if the content of phenolic resin is excessively low, the bonding between the fibers becomes weak, resulting in a decrease in mechanical properties of the material; if the content of phenolic resin is excessively high, the material shrinks seriously during carbonization. In some embodiments, a mass ratio of the viscose-based carbon fiber to the phenolic resin is 1:1, and in this case the material does not shrink basically.

In some embodiments, in step (1), a mass ratio of the high-thermal conduction carbon fiber, the phenolic resin and water is in a range of 1:2:(50-70), for example 1:2:50, 1:2:55, 1:2:60, 1:2:65 or 1:2:70.

In some embodiments, in step (1), the viscose-based carbon fiber has a length of less than 1 mm, for example 0.1 mm, 0.5 mm and 0.8 mm. The viscose-based carbon fiber is generally a chopped viscose-based carbon fiber.

In some embodiments, in step (1), the high-thermal conduction carbon fiber has a length of 1 mm to 10 mm, for example 1 mm, 2 mm, 3 mm, 4 mm, 5 mm, 6 mm, 7 mm, 8 mm, 9 mm or 10 mm. The high-thermal conduction carbon fiber forms a high-thermal conduction layer. The materials in the high-thermal conduction layer may be replaced by materials with a high thermal conductivity, such as graphene and carbon nanotubes.

In some embodiments, in step (1), the high-thermal conduction carbon fiber has a thermal conductivity of 600 W/(m·k) to 1000 W/(m·k), for example 600 W/(m·k), 700 W/(m·k), 800 W/(m·k), 900 W/(m·k) or 1000 W/(m·k).

In some embodiments, in step (1), in the dispersion I, a mass of polyacrylamide is 0.01% to 0.1% of a mass of the viscose-based carbon fiber, for example 0.01%, 0.05%, 0.08% or 0.1%. In the present disclosure, if the content of polyacrylamide is excessively low, it cannot play any role; if the content of polyacrylamide is excessively high, the fibers are prone to aggregating into agglomerates, reducing the dispersibility.

In some embodiments, in step (1), in the dispersion II, a mass of polyacrylamide is 0.01% to 0.1% of a mass of the high-thermal conduction carbon fiber, for example 0.01%, 0.05%, 0.08% or 0.1%.

In some embodiments, in step (1), the viscose-based carbon fiber, the phenolic resin and polyacrylamide are dispersed in water under stirring; the stirring is conducted at a rotation speed within a range of 500 r/min to 800 r/min, for example 500 r/min, 600 r/min, 700 r/min or 800 r/min; the stirring is conducted for 20 min to 40 min, for example 20 min, 30 min and 40 min. Each of the viscose-based carbon fiber, the phenolic resin and polyacrylamide is added to water under stirring.

In some embodiments, in step (1), the high-thermal conduction carbon fiber, the phenolic resin and polyacrylamide are dispersed in water under stirring; the stirring is conducted at a rotation speed within a range of 500 r/min to 800 r/min, for example 500 r/min, 600 r/min, 700 r/min or 800 r/min; the stirring is conducted for 20 min to 40 min, for example 20 min, 30 min and 40 min. Each of the high-thermal conduction carbon fiber, the phenolic resin and polyacrylamide is added to water under stirring.

In step (2), the dispersion I and the dispersion II are divided equally into several parts, respectively, each part of the dispersion I and each part of the dispersion II are poured into a mold alternately until all the dispersion I and the dispersion II are poured, and water is drained after each pouring of a part of the dispersion I or a part of the dispersion II. For example, the steps may be performed as follows:

dividing equally the dispersion I into 3 parts, and dividing equally the dispersion II into 2 parts; pouring 1 part of the dispersion I into a mold followed by draining once, and then pouring 1 part of the dispersion II followed by draining once; thereafter, pouring 1 part of the dispersion I into the mold followed by draining once, and then pouring 1 part of the dispersion II followed by draining once; finally, pouring 1 part of the dispersion I into the mold followed by draining once. At this time, both of the dispersion I and the dispersion II are fully poured, and a porous carbon fiber skeleton is obtained.

Each part of the dispersion I or the dispersion II may form a monolayer structure. During the actual preparation processes, the thickness of the layers and the amount of the dispersion I or the dispersion II may be adjusted to further achieve the purpose of adjusting material properties. For example, the using amount of the dispersion II may be controlled, such that the high-thermal conduction carbon fiber in this layer has a mass of 0.4 g.

In some embodiments, in step (2), the mold is a cylindrical mold. The shape of the mold determines the shape of the material with directional thermal conduction and thermal insulation, and may be changed according to the actual needs. The mold is arranged with a hole for draining.

In some embodiments, the cylindrical mold has a diameter of 50 mm to 70 mm, for example 50 mm, 55 mm, 60 mm, 65 mm or 70 mm.

In some embodiments, in step (2), the dispersion I is preferentially poured into the mold to act as a substrate of the porous carbon fiber skeleton. In the present disclosure, the viscose-based carbon fiber is used as the substrate, and this may provide a superior thermal insulation performance in the thickness direction. Moreover, the rest phenolic resin powders have stronger bonding, which is conducive to improving the mechanical properties of materials. In terms of economy, the viscose-based carbon fiber is cheaper and thus more advantageous than the high-thermal conduction carbon fiber.

In some embodiments, in step (2), the draining is conducted by suction filtration or press filtration.

In the present disclosure, the liquid in the mold is removed by suction filtration or press filtration, such that the fibers form a layered structure in the mold.

In some embodiments, in step (2), the porous carbon fiber skeleton has a multi-layer structure.

In some embodiments, in step (2), the porous carbon fiber skeleton is dried before the solidifying. The drying may generally be conducted at 80° C. for 2 h to achieve complete drying.

In some embodiments, in step (2), the solidifying is conducted at a temperature within a range of 120° C. to 180° C., for example 120° C., 130° C., 140° C., 150° C., 160° C., 170° C. or 180° C.

In some embodiments, in step (2), the solidifying is conducted for 3 h to 7 h, for example 3 h, 4 h, 5 h, 6 h or 7 h.

In some embodiments, in step (3), the heat treatment is conducted as follows: placing the preform in a heat treatment device, heating to 1,000° C. at a rate of 2° C/min to 5° C/min, and holding for 1 h to 2 h to obtain the material with directional thermal conduction and thermal insulation.

The present disclosure further provides a material with directional thermal conduction and thermal insulation prepared by the preparation method above. In the present disclosure, the in-plane thermal conductivity may vary greatly due to the difference in the content of the high-thermal conduction carbon fiber. The thermal conductivity in the thickness direction is relatively low, and thus may be affected by the density and testing method to result in differences.

In the present disclosure, the material with directional thermal conduction and thermal insulation prepared has an in-plane thermal conductivity of 0.507 W/(m·K) to 2.132 W/(m·K), a thickness-direction thermal conductivity of 0.041 W/(m·K) to 0.139 W/(m·K), a density of 0.2 g/cm$^3$ to 0.25 g/cm$^3$, and a desirable thermal insulation performance.

In the present disclosure, the material with directional thermal conduction and thermal insulation especially shows performance advantages in the in-plane thermal conductivity, which may reach up to 2.132 W/(m·K). This allows the local high temperature of a thermal insulation material being rapidly delivered to the low-temperature areas during service, so as to solve the problems of high temperature and slow heat dissipation of the material itself, thereby effectively increasing the service life of the material and improving the thermal insulation efficiency.

In the present disclosure, the material with directional thermal conduction and thermal insulation realizes a high in-plane thermal conductivity under the premise of ensuring a thermal insulation in the thickness direction, and achieves an effect of integrated heat insulation and heat dissipation. Moreover, the material has a porous structure, and thus may be filled with thermal insulation components such as carbon aerogels and silica aerogels to obtain a high temperature-resistant thermal insulation material with high strength, lightweight and more excellent thermal insulation performance.

The present disclosure has the following beneficial effects:

In the present disclosure, the material with directional thermal conduction and thermal insulation prepared has an in-plane thermal conductivity of 0.507 W/(m·K) to 2.132 W/(m·K), a thickness-direction thermal conductivity of 0.041 W/(m·K) to 0.139 W/(m·K), a density of 0.2 g/cm$^3$ to 0.25 g/cm$^3$, and a desirable thermal insulation performance.

In the present disclosure, the material with directional thermal conduction and thermal insulation especially shows performance advantages in the in-plane thermal conductivity, which may reach up to 2.132 W/(m·K). This allows the local high temperature of a thermal insulation material being rapidly delivered to the low-temperature areas during service, so as to solve the problems of high temperature and slow heat dissipation of the material itself, thereby effectively increasing the service life of the material and improving the thermal insulation efficiency.

In the present disclosure, the material with directional thermal conduction and thermal insulation realizes a high in-plane thermal conductivity under the premise of ensuring a thermal insulation in the thickness direction, and achieves an effect of integrated heat insulation and heat dissipation. Moreover, the material has a porous structure, and thus may be filled with thermal insulation components such as carbon aerogels and silica aerogels to obtain a high temperature-resistant thermal insulation material with high strength, lightweight and more excellent thermal insulation performance.

In the present disclosure, carbon fibers and a binder are dispersed in water to prepare a porous fiber skeleton, which is further subjected to a thermal treatment to obtain a material with directional thermal conduction and thermal insulation. During preparation, the phenolic resin is melted or pyrolyzed and carbonized at a high temperature and attached to surface of the fibers as a binder for the fibers to lap the fibers together. As a result, sites are formed at the lapped joints of the fibers, affording the fiber skeleton extremely high mechanical properties. The preparation process is simple and easy for operation. The product is adjustable in size and shape, easy for processing and allowed to be determined according to specific design requirements, and has a desirable thermal insulation performance.

DETAILED DESCRIPTION OF THE EMBODIMENTS

Figure 1:
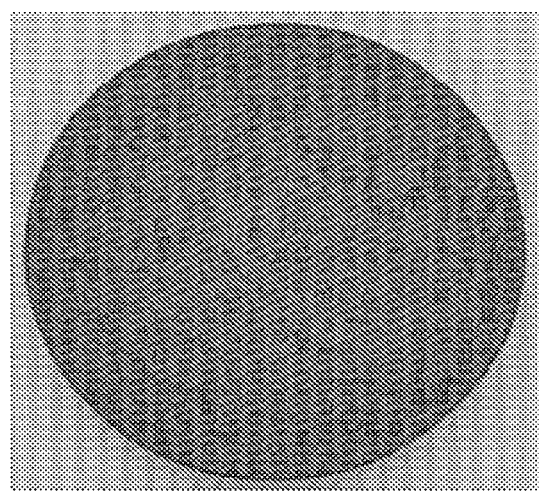
FIG. 1 shows a top view of the material with directional thermal conduction and thermal insulation prepared according to Example 3 of the present disclosure.

In order to make the objects, technical solutions and advantages of the present disclosure more clear, the technical solutions of the examples in the present disclosure will be clearly and completely described below with reference to drawings of the examples in the present disclosure. It is evident that the examples described are merely a part, rather than all of the examples in the present disclosure. Based on the examples in the present disclosure, all other examples obtained by those ordinarily skilled in the art without creative work shall fall within the protection scope of the present disclosure.

Example 1

A multi-layer material with directional thermal conduction and thermal insulation was provided in the example. The material included a viscose-based carbon fiber, a high-thermal conduction carbon fiber and a binder.

The viscose-based carbon fiber was used as a substrate with a fiber length of less than 1 mm. The high-thermal conduction carbon fiber was used as a thermal conduction enhancer. A cylindrical mold with a diameter of 60 mm was used, and 0.4 g of the high-thermal conduction carbon fibers was contained in each layer. The binder was phenolic resin powders.

A preparation process was performed in the following steps:

(1) 7 g of the viscose-based carbon fiber was added to 350 g of deionized water, stirred and dispersed evenly with a mechanical stirrer at a rotation speed of 700 r/min for 20 min, and poured into a beaker to obtain a dispersion I. 0.4 g of the high-thermal conduction carbon fiber was added to 20 g of deionized water, and stirred evenly with a mechanical stirrer at a rotation speed of 700 r/min for 20 min to obtain a dispersion II.

7 g of the phenolic resin powders were added to the dispersion I, and stirred evenly with a mechanical stirrer at a rotation speed of 700 r/min for 20 min. 0.4 g of the phenolic resin powders were added to the dispersion II, and stirred evenly with a mechanical stirrer at a rotation speed of 700 r/min for 20 min.

0.07 g of polyacrylamide was added to 20 g of deionized water for a full dissolution, and was then added to the dispersion I, followed by being stirred evenly with a mechanical stirrer at a rotation speed of 700 r/min for 5 min. 0.004 g of polyacrylamide was added to 10 g of deionized water for a full dissolution, and was then added to the dispersion II, followed by being stirred evenly with a mechanical stirrer at a rotation speed of 700 r/min for 5 min.

(2) The dispersion I was divided into two equal parts and one part was poured into the mold which was a cylindrical sleeve with small holes at the bottom and a diameter of φ 60 mm. After conducting a press filtration, the dispersion II was poured into the mold and another press filtration was conducted. The remaining one part of the dispersion I was poured into the mold from the top and another press filtration was continued to obtain a porous carbon fiber skeleton with a thickness of 15 mm. The fiber skeleton was heated at 80° C. for 2 h and then solidified at 150° C. for 5 h to obtain a preform of porous carbon fiber-based thermal insulation material.

(3) The preform obtained in step (2) was put into a tubular furnace for a heat treatment under protection of an argon atmosphere to obtain a material with directional thermal conduction and thermal insulation. The heat treatment was conducted at 1,000° C. for 1 h. The phenolic resin powders used as the binder were pyrolyzed and carbonized at high temperature and then attached to a surface of the fibers to bond the lapping joints of the fibers, so as to form sites at the lapping joints of the fibers, affording the porous carbon fiber-based thermal insulation material desirable mechanical properties.

The thickness-direction thermal conductivity of the material at room temperature tested according to GB/T10295-2008 was 0.0577 W/(m·K), and the in-plane thermal conductivity of the material at room temperature tested with a NETZSCH LFA457Micro Flash laser thermal conductivity meter was 0.507 W/(m·K).

Example 2

A multi-layer material with directional thermal conduction and thermal insulation was provided in the example. The material included a viscose-based carbon fiber, a high-thermal conduction carbon fiber and a binder.

The viscose-based carbon fiber was used as a substrate with a fiber length of less than 1 mm. The high-thermal conduction carbon fiber was used as a thermal conduction enhancer. A cylindrical mold with a diameter of 60 mm was used, and 0.4 g of the high-thermal conduction carbon fibers was contained in each layer. The binder was phenolic resin powders.

A preparation process was performed in the following steps:

(1) 7 g of the viscose-based carbon fiber was added to 350 g of deionized water, stirred and dispersed evenly with a mechanical stirrer at a rotation speed of 700 r/min for 20 min, and poured into a beaker to obtain a dispersion I. 0.8 g of the high-thermal conduction carbon fiber was added to 40 g of deionized water, and stirred evenly with a mechanical stirrer at a rotation speed of 700 r/min for 20 min to obtain a dispersion II.

7 g of the phenolic resin powders were added to the dispersion I, and stirred evenly with a mechanical stirrer at a rotation speed of 700 r/min for 20 min. 0.8 g of the phenolic resin powders were added to the dispersion II, and stirred evenly with a mechanical stirrer at a rotation speed of 700 r/min for 20 min.

0.07 g of polyacrylamide was added to 20 g of deionized water for a full dissolution, and was then added to the dispersion I, followed by being stirred evenly with a mechanical stirrer at a rotation speed of 700 r/min for 5 min. 0.008 g of polyacrylamide was added to 10 g of deionized water for a full dissolution, and was then added to the dispersion II, followed by being stirred evenly with a mechanical stirrer at a rotation speed of 700 r/min for 5 min.

(2) The dispersion I was divided into three equal parts, and the dispersion II was divided into two equal parts. The parts of the dispersion I and the dispersion II were alternately poured into the mold which was a cylindrical sleeve with small holes at the bottom and a diameter of φ 60 mm. After one part was poured into the mold, a press filtration was conducted before the next part was poured, thereby obtaining a porous carbon fiber skeleton with a thickness of 15 mm. The fiber skeleton was heated at 80° C. for 2 h and then solidified at 150° C. for 5 h to obtain a preform of porous carbon fiber-based thermal insulation material.

(3) The preform obtained in step (2) was put into a tubular furnace for a heat treatment under protection of an argon atmosphere to obtain a material with directional thermal conduction and thermal insulation. The heat treatment was conducted at 1,000° C. for 1 h. The phenolic resin powders used as the binder were pyrolyzed and carbonized at high temperature and then attached to a surface of the fibers to bond the lapping joints of the fibers, so as to form sites at the lapping joints of the fibers, affording the porous carbon fiber-based thermal insulation material desirable mechanical properties.

The thickness-direction thermal conductivity of the material at room temperature tested according to GB/T10295-2008 was 0.0516 W/(m·K), and the in-plane thermal conductivity of the material at room temperature tested with a NETZSCH LFA457Micro Flash laser thermal conductivity meter was 0.707 W/(m·K).

Example 3

A multi-layer material with directional thermal conduction and thermal insulation was provided in the example. The material included a viscose-based carbon fiber, a high-thermal conduction carbon fiber and a binder.

The viscose-based carbon fiber was used as a substrate with a fiber length of less than 1 mm. The high-thermal conduction carbon fiber was used as a thermal conduction enhancer. A cylindrical mold with a diameter of 60 mm was used, and 0.4 g of the high-thermal conduction carbon fibers was contained in each layer. The binder was phenolic resin powders.

A preparation process was performed in the following steps:

(1) 7 g of the viscose-based carbon fiber was added to 350 g of deionized water, stirred and dispersed evenly with a mechanical stirrer at a rotation speed of 700 r/min for 20 min, and poured into a beaker to obtain a dispersion I. 1.2 g of the high-thermal conduction carbon fiber was added to 60 g of deionized water, and stirred evenly with a mechanical stirrer at a rotation speed of 700 r/min for 20 min to obtain a dispersion II.

7 g of the phenolic resin powders were added to the dispersion I, and stirred evenly with a mechanical stirrer at a rotation speed of 700 r/min for 20 min. 1.2 g of the phenolic resin powders were added to the dispersion II, and stirred evenly with a mechanical stirrer at a rotation speed of 700 r/min for 20 min.

0.07 g of polyacrylamide was added to 20 g of deionized water for a full dissolution, and was then added to the dispersion I, followed by being stirred evenly with a mechanical stirrer at a rotation speed of 700 r/min for 5 min. 0.012 g of polyacrylamide was added to 15 g of deionized water for a full dissolution, and was then added to the dispersion II, followed by being stirred evenly with a mechanical stirrer at a rotation speed of 700 r/min for 5 min.

(2) The dispersion I was divided into four equal parts, and the dispersion II was divided into three equal parts. The parts of the dispersion I and the dispersion II were alternately poured into the mold which was a cylindrical sleeve with small holes at the bottom and a diameter of φ 60 mm. After one part was poured into the mold, a press filtration was conducted before the next part was poured, thereby obtaining a porous carbon fiber skeleton with a thickness of 15 mm. The fiber skeleton was heated at 80° C. for 2 h and then solidified at 150° C. for 5 h to obtain a preform of porous carbon fiber-based thermal insulation material.

Figure 2:
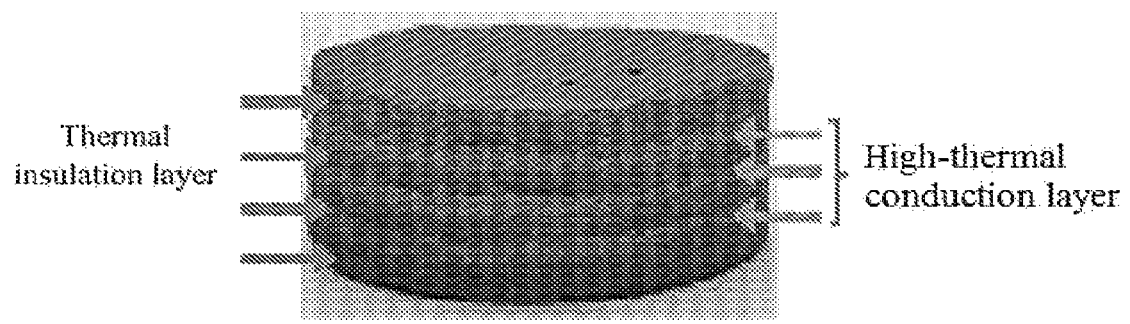
FIG. 2 shows a side view of the material with directional thermal conduction and thermal insulation prepared according to Example 3 of the present disclosure.

(3) The preform obtained in step (2) was put into a tubular furnace for a heat treatment under protection of an argon atmosphere to obtain a material with directional thermal conduction and thermal insulation. The heat treatment was conducted at 1,000° C. for 1 h. The prepared materials with directional thermal conduction and thermal insulation were shown in FIG. 1 and FIG. 2. The phenolic resin powders used as the binder were pyrolyzed and carbonized at high temperature and then attached to a surface of the fibers to bond the lapping joints of the fibers, so as to form sites at the lapping joints of the fibers, affording the porous carbon fiber-based thermal insulation material desirable mechanical properties.

The thickness-direction thermal conductivity of the material at room temperature tested according to GB/T10295-2008 was 0.0491 W/(m·K), and the in-plane thermal conductivity of the material at room temperature tested with a NETZSCH LFA457Micro Flash laser thermal conductivity meter was 1.136 W/(m·K).

Example 4

Example 4 differs from Example 1 in that in step (2), the dispersion II was divided into two equal parts and the dispersion I was one part. The dispersion II, dispersion I and dispersion II were poured into the mold in sequence to form a porous carbon fiber skeleton, from which a material with directional thermal conduction and thermal insulation was finally prepared.

The material with directional thermal conduction and thermal insulation prepared in the example had a deteriorated thermal insulation performance in thickness direction, and the high-thermal conduction carbon fiber tended to shrink during heating and carbonization, which was not conducive to maintaining the shape of the material.

Comparative Example 1

Comparative Example 1 differs from Example 1 in that the dispersion I was not divided into equal parts, but was directly mixed with the dispersion II and then poured into the mold. The other steps were the same as those in Example 1. A material with directional thermal conduction and thermal insulation was prepared.

The material with directional thermal conduction and thermal insulation provided in the example had poor in-plane heat conduction and a reduced thermal conductivity.

The fibers are anisotropic, and the thermal conductivity along a fiber direction is higher. When the high-thermal conduction fibers are located in the same layer, these fibers are basically distributed in x and y directions, and thus a thermal conduction path may be formed in the plane. If the two fibers are simply mixed, the heat transfer in the plane may be affected due to the poor thermal conduction of the viscose-based carbon fiber. Meanwhile, in the case of the multi-layer structure, the heat may be partially dissipated at the first layer of high-thermal conduction fibers before transferring downward, bringing a better protection for the parts under the layer of high-thermal conduction fibers.

Comparative Example 2

Comparative Example 2 differs from Example 1 in that no high-thermal conduction carbon fiber was used, that is, no dispersion II was contained. The other steps were the same as those in Example 1. A material with directional thermal conduction and thermal insulation was prepared.

In the absence of high-thermal conduction carbon fibers, the in-plane thermal conduction of the material is significantly reduced, failing to achieve the effect of heat dissipation. A test on a laser thermal conductivity meter shows that a pure viscose-based carbon fiber has an in-plane thermal conductivity of only 0.113 W/(m·K), while a high-thermal conduction carbon fiber has a thermal conductivity of 800 W/(m·K) along a fiber direction. In a background temperature test, under the same heating temperature, a temperature increase of the high-thermal conduction fiber along the fiber direction is at least 250° C. higher than that of the viscose-based carbon fiber.

Finally, it should be noted that the embodiments above are only used for illustrating the technical solutions of the present disclosure, rather than limiting the present disclosure. Although the present disclosure is described in detail with reference to the above embodiments, it should be understood that for those ordinary skilled in the art, several modifications could be made to the technical solutions described in the above embodiments, or several equivalent substitutions could be made to some of the technical features therein. These modifications or substitutions do not make the essence of the corresponding technical solutions depart from the spirit and scope of the technical solutions in the embodiments of the present disclosure.

What is claimed is:

1. A method for preparing a material with directional thermal conduction and thermal insulation, comprising:
    (1) dispersing a viscose-based carbon fiber in water and adding a phenolic resin and polyacrylamide in sequence to obtain a dispersion I; dispersing a high-thermal conduction carbon fiber in water and adding a phenolic resin and polyacrylamide in sequence to obtain a dispersion II, wherein a mass ratio of the high-thermal conduction carbon fiber, the phenolic resin and water range of 1.2:(50-70), and the high-thermal conduction carbon fiber has a length of 1 mm to 10 mm and a thermal conductivity of 600 W/(m·k) to 1,000 W/(m·k);
    (2) dividing equally the dispersion I and the dispersion II into several parts, respectively, pouring each part of the dispersion I and each part of the dispersion II into a mold alternately until all the dispersion I and the dispersion II are poured, draining after each pouring of a part of the dispersion I or a part of the dispersion II to obtain a porous carbon fiber skeleton, and then solidifying the porous carbon fiber skeleton to obtain a preform; and
    (3) subjecting the preform obtained in step (2) to a heat treatment to obtain the material with directional thermal conduction and thermal insulation.

2. The method according to claim 1, wherein in step (1), a mass ratio of the viscose-based carbon fiber, the phenolic resin and water is in a range of 1:(0.5-1):(50-70).

3. The method according to claim 1, wherein in step (1), the viscose-based has a length of less than 1 mm.

4. The method according to claim 1, wherein in step (1), in the dispersion I, a mass of polyacrylamide is 0.01% to 0.1% of a mass of the viscose-based carbon fiber;
    in step (1), in the dispersion II, a mass of polyacrylamide is 0.01% to 0.1% of a mass of the high-thermal conduction carbon fiber.

5. The method according to claim 1, wherein in step (1), the viscose-based carbon fiber, the phenolic resin and polyacrylamide are dispersed in water under stirring, and the stirring is conducted at a rotation speed within a range of 500 r/min to 800 r/min for 20 min to 40 min.

6. The method according to claim 1, wherein in step (2), the mold is a cylindrical mold.

7. The method according to claim 1, wherein in step (2), the dispersion I is poured into the mold to act as a substrate of the porous carbon fiber skeleton.

8. The method according to claim 1, wherein in step (2), the porous carbon fiber skeleton has a multi-layer structure.

9. The method according to claim 1, wherein in step (3), the heat treatment is conducted as follows: placing the preform in a heat treatment device, heating to 1,000° C. at a rate of 2° C/min to 5° C/min, and holding for 1 h to 2 h to obtain the material with directional thermal conduction and thermal insulation.

10. The method according to claim 1, wherein in step (1), the high-thermal conduction carbon fiber, the phenolic resin and polyacrylamide are dispersed in water under stirring, and the stirring is conducted at a rotation speed within a range of 500 r/min to 800 r/min for 20 min to 40 min.

11. The method according to claim 6, wherein the cylindrical mold has a diameter of 50 mm to 70 mm.

12. The method according to claim 1, wherein in step (2), the draining is conducted by suction filtration or press filtration.

13. The method according to claim 1, wherein in step (2), the porous carbon fiber skeleton is dried before the solidifying.

14. The method according to claim 1, wherein in step (2), the solidifying is conducted at a temperature within a range of 120° C. to 180° C.

15. The method according to claim 1, wherein in step (2), the solidifying is conducted for 3 h to 7 h.

* * * * *